(12) United States Patent
Shin et al.

(10) Patent No.: US 12,072,549 B2
(45) Date of Patent: Aug. 27, 2024

(54) REFLECTIVE MODULE ASSEMBLY AND CAMERA MODULE COMPRISING THE SAME

(71) Applicant: SAMSUNG ELECTRO-MECHANICS CO., LTD., Suwon-si (KR)

(72) Inventors: Jun Sup Shin, Suwon-si (KR); Po Chul Kim, Suwon-si (KR); Ah Hyeon Im, Suwon-si (KR); Ik Sun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 182 days.

(21) Appl. No.: 17/707,356

(22) Filed: Mar. 29, 2022

(65) Prior Publication Data

US 2022/0350108 A1 Nov. 3, 2022

(30) Foreign Application Priority Data

Apr. 28, 2021 (KR) .................. 10-2021-0055075
Feb. 21, 2022 (KR) .................. 10-2022-0022296

(51) Int. Cl.
*G02B 7/182* (2021.01)
*G03B 17/17* (2021.01)
*G03B 13/36* (2021.01)

(52) U.S. Cl.
CPC ............ *G02B 7/182* (2013.01); *G03B 17/17* (2013.01); *G03B 13/36* (2013.01); *G03B 2205/0007* (2013.01)

(58) Field of Classification Search
None
See application file for complete search history.

(56) References Cited

U.S. PATENT DOCUMENTS 4,268,119 A * 5/1981 Hartmann .......... G02B 27/1013
348/338
4,615,590 A * 10/1986 Alvarez ................ H04N 23/68
396/529

(Continued)

FOREIGN PATENT DOCUMENTS

CN 107942605 A 4/2018
CN 208060910 U 11/2018

(Continued)

OTHER PUBLICATIONS

Korean Office Action issued on Sep. 5, 2023, in corresponding Korean Patent Application No. 10-2022-0022296 (5 pages in English, 4 pages in Korean).

(Continued)

*Primary Examiner* — Rodney E Fuller
(74) *Attorney, Agent, or Firm* — NSIP Law

(57) ABSTRACT

A reflective module assembly including a housing having an internal space, and a reflective module accommodated in the internal space of the housing, wherein the reflective module includes a reflective holder supporting a reflective member configured to change a path of incident light, at least one damper coupled to the reflective holder, and a damper holder supporting the at least one damper, and wherein the at least one damper is coupled to the reflective holder through the damper holder.

21 Claims, 14 Drawing Sheets

(56) References Cited

U.S. PATENT DOCUMENTS

| | | | |
|---|---|---|---|
| 4,650,298 A * | 3/1987 | Katoh | G02B 7/182 |
| | | | 356/138 |
| 10,534,194 B2 | 1/2020 | Lee et al. | |
| 2011/0026090 A1* | 2/2011 | Minor | F41G 1/40 |
| | | | 359/638 |
| 2018/0109660 A1 | 4/2018 | Yoon et al. | |
| 2018/0239162 A1 | 8/2018 | Lee et al. | |
| 2019/0227257 A1 | 7/2019 | Song | |
| 2020/0137274 A1 | 4/2020 | Lee et al. | |
| 2020/0348479 A1 | 11/2020 | Kwon et al. | |
| 2020/0371309 A1* | 11/2020 | Noriyuki | G02B 6/4204 |
| 2023/0239560 A1* | 7/2023 | Im | H05K 1/181 |
| | | | 396/439 |

FOREIGN PATENT DOCUMENTS

| | | | |
|---|---|---|---|
| CN | 111103742 A | | 5/2020 |
| CN | 111208621 A | * | 5/2020 |
| JP | 2003-295353 A | | 10/2003 |
| KR | 10-2018-0086762 A | | 8/2018 |
| KR | 10-2018-0095420 A | | 8/2018 |
| KR | 10-2020-0126873 A | | 11/2020 |
| KR | 10-2021-0009495 A | | 1/2021 |
| KR | 10-2021-0011777 A | | 2/2021 |

OTHER PUBLICATIONS

Chinese Office Action issued on Mar. 18, 2024, in counterpart Chinese Patent Application No. 202210455843.5 (4 pages in English, 8 pages in Chinese).

* cited by examiner

REFLECTIVE MODULE ASSEMBLY AND CAMERA MODULE COMPRISING THE SAME

CROSS-REFERENCE TO RELATED APPLICATIONS

This application claims the benefit under 35 USC 119(a) of Korean Patent Applications Nos. 10-2021-0055075 filed on Apr. 28, 2021, and 10-2022-0022296 filed on Feb. 21, 2022, in the Korean Intellectual Property Office, the entire disclosures of which are incorporated herein by reference for all purposes.

BACKGROUND

1. Field

The present disclosure relates to a reflective module assembly and a camera module including the same.

2. Description of the Background

A camera module may be installed in a portable electronic device such as a tablet personal computer (PC) or a laptop computer as well as a smartphone, and an autofocus (AF) function, an optical image stabilization (OIS) function, a zoom function, and the like may be added to a camera module for a mobile terminal.

In addition, the camera module may include an actuator that directly moves a lens module or indirectly moves a reflective module including a reflective member stabilizing an optical image. In addition, the actuator may move or rotate the lens module or the reflective module in various directions using driving force generated by a magnet and a coil.

The lens module or the reflective module may be rotated or moved in a housing when the camera module is shaken or the like in a state in which power is not applied to the actuator in addition to being driven by the actuator.

The camera module may have a very narrow internal space accommodating the camera module having a smaller size, and the lens module and the reflective module may thus collide with a fixture disposed in the camera module while being moved in the internal space of the housing.

In particular, the reflective member (e.g., prism) disposed in the reflective module may have a relatively large load, and a large impact may thus occur when the reflective member collides with the fixture disposed in the camera module while being moved or rotated. The reflective module may be damaged due to such an impact, and a loud impact sound (e.g., noise or joint noise) may repeatedly occur.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a reflective module assembly includes a housing having an internal space, and a reflective module accommodated in the internal space of the housing, wherein the reflective module includes a reflective holder supporting a reflective member configured to change a path of incident light, at least one damper coupled to the reflective holder, and a damper holder supporting the at least one damper, and wherein the at least one damper is coupled to the reflective holder through the damper holder.

A damping gap may be formed between the at least one damper and the reflective holder.

The at least one damper may protrude in a direction perpendicular to an incident surface of the reflective member.

The damper holder may include a first extension portion extended across a lower surface of the reflective holder, and a fastening portion bent and extended from each of two ends of the first extension portion and fixing the damper holder to the reflective holder, and the at least one damper may include at least one first damper inserted and supported by the first extension portion.

The first extension portion may be in contact with the lower surface of the reflective holder, a first damper groove accommodating at least a portion of the at least one first damper may be disposed in the lower surface of the reflective holder, and a first damping gap may be formed between the first damper groove and the at least one first damper.

The at least one first damper may include a plurality of first dampers disposed on the first extension portion in a length direction, and a distance between the plurality of first dampers may be equal to or less than a width of the reflective member.

The at least one first damper of the reflective module may be configured to first come into contact with a lower surface of the housing as the reflective holder is moved toward the lower surface of the housing.

The housing may further include a protrusion protruding from a portion of the lower surface of the housing, facing the at least one first damper, toward the reflective holder.

The reflective holder may further include a fastening protrusion protruding toward the damper holder, and a fastening groove into which the fastening protrusion is inserted may be disposed in the fastening portion of the damper holder.

The damper holder may further include second extension portions respectively extended from ends of the fastening portions along an upper surface of the reflective holder in opposite directions, and the at least one damper may include at least one second damper inserted and supported by the second extension portion.

The second extension portions may be spaced apart from each other by a distance corresponding to a width of the reflective member or more.

A second damper groove accommodating at least a portion of the at least one second damper may be disposed in the upper surface of the reflective holder, and a second damping gap may be formed between the second damper groove and the at least one second damper.

The reflective module assembly may further include an upper cover covering the housing, wherein the at least one second damper of the reflective module may be configured to first come into contact with the upper cover as the reflective holder is moved toward the upper cover.

The damper holder may include a coupling portion extended parallel to an exit surface of the reflective member and coupled to the reflective holder, and a bent portion bent at each of two ends of the coupling portion, and the at least one damper may include at least one third damper inserted and supported by the bent portion.

The at least one third damper may be disposed to face a partial surface of the reflective holder, and a third damping gap may be formed between the at least one third damper and the partial surface of the reflective holder.

The damper holder may include a plurality of damper holders, and the plurality of damper holders may be coupled to the reflective holder interposing the reflective member therebetween.

A camera module may include the reflective module assembly, a lens module assembly through which light emitted from the reflective member passes, and an image sensor configured to convert light passing through the lens module assembly into an electrical signal.

The lens module assembly may include at least one lens barrel disposed in an optical axis direction.

The at least one damper included in the reflective module assembly may protrude from the reflective holder in a direction intersecting the optical axis direction.

In another general aspect, a reflective module for a camera module includes a housing, a reflective holder disposed in the housing and movable in a first direction based on the housing, a reflective member disposed on the reflective holder configured to change a path of light, a damper holder coupled to the reflective holder, and a damper disposed on the damper holder protruding in the first direction.

The damper may protrude through the damper holder and the damper may be spaced apart from the reflective holder by a damping gap.

The damper holder may be configured to elastically flex upon a force applied to the damper in the first direction prior to the damper contacting the reflective holder.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
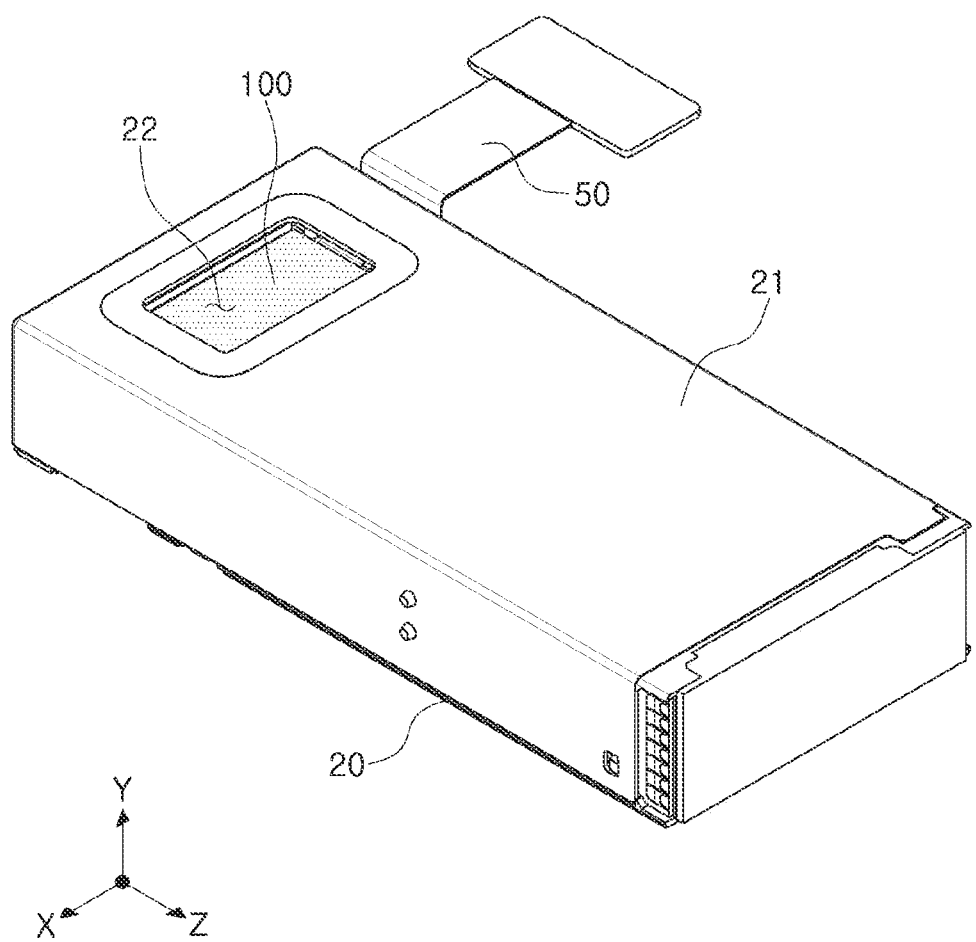
FIG. 1 is a perspective view of a camera module according to an example embodiment.

Hereinafter, example embodiments in the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a damper structure which may mitigate an impact transmitted to a reflective module.

Another aspect of the present disclosure may provide a reflective module assembly which may reduce an impact sound (e.g., noise or joint noise) occurring when a reflective module collides with another fixture disposed in the housing, and a camera module including the same.

Figure 2:
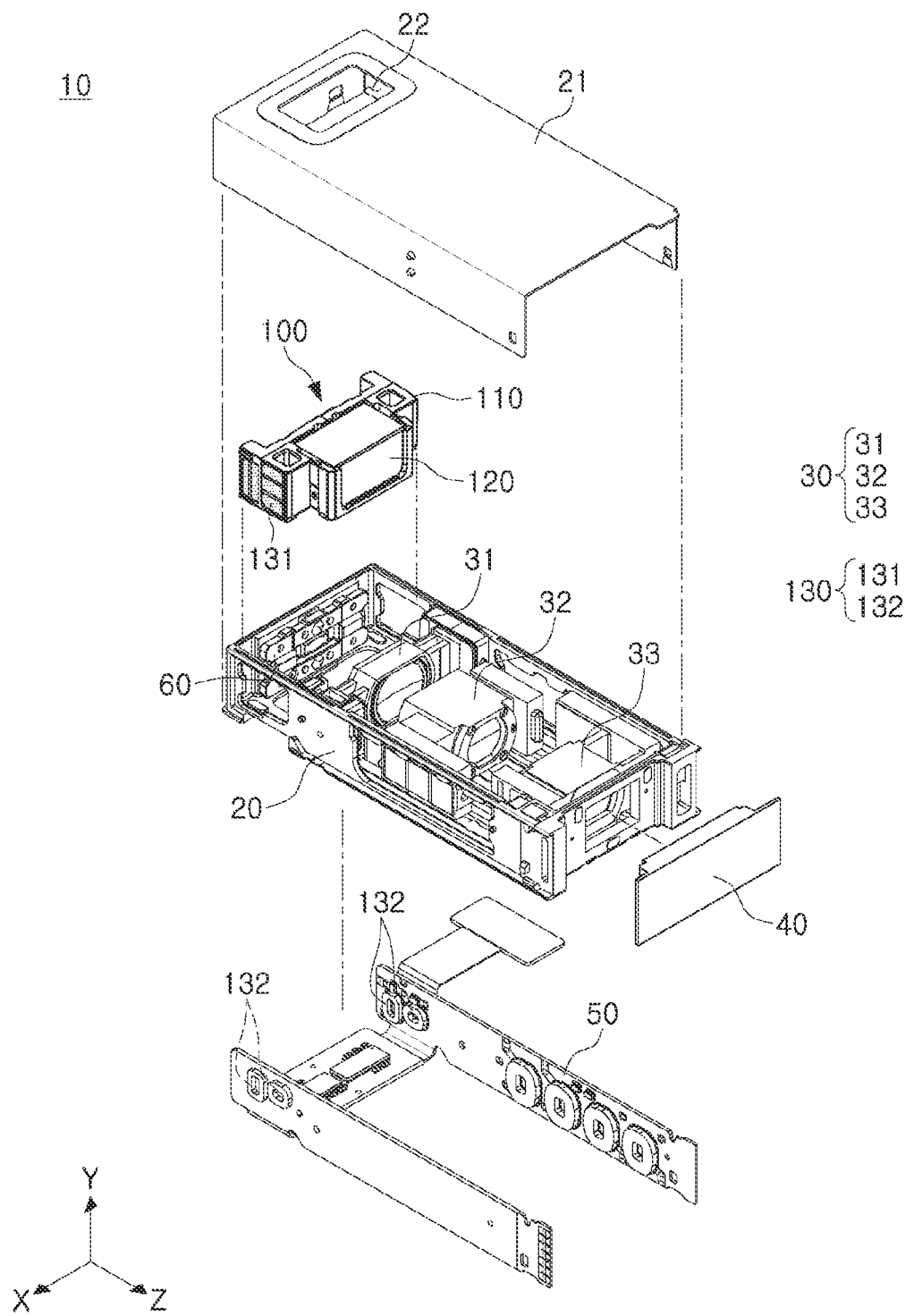
FIG. 2 is an exploded perspective view of the camera module according to an example embodiment.

FIG. 1 is a perspective view of a camera module 10 according to an example embodiment; and FIG. 2 is an exploded perspective view of the camera module 10 according to an example embodiment.

The camera module 10 according to an example embodiment may include a housing 20 having an internal space, a reflective module 100 accommodated in the internal space of the housing 20, a lens module 30, an image sensor module 40 and an upper cover 21 covering an upper portion of the housing 20.

The reflective module 100 may change a propagation direction of incident light. Light incident from an external subject (not shown) of the camera module 10 may have the propagation direction changed to the lens module 30 by the reflective module 100. For example, light incident in a thickness direction (e.g., Y-axis direction) of the camera module 10 through an opening 22 formed by opening at least a partial surface of the upper cover 21 may change a path of light to be in a direction approximately coincident with an optical axis direction (e.g., Z-axis direction) of the lens module 30 by the reflective module 100. The reflective module 100 may include a reflective member 120 reflecting light in order to change the path of light. In the camera module 10 according to an example embodiment, the reflective member 120 included in the reflective module 100 may be rotated about a rotation axis or moved in various directions to perform an optical image stabilization (hereinafter, OIS) function.

The camera module 10 may include a guide member 60 guiding the movement of the reflective module 100. The guide member 60 may be disposed adjacent to the reflective module 100, and guide the reflective module 100 to be rotated about a certain axis or to be moved in a certain direction. For example, the guide member 60 may include a ball member (not shown) or a pivot member (not shown) forming the rotation axis of the reflective module 100, or a rail member (not shown) forming a movement path of the reflective module 100.

The lens module 30 may include one or more lens barrels 31, 32 and 33 accommodating a lens through which light having the propagation direction changed by the reflective module 100 passes. The lens barrel 31, 32 or 33 may be moved in the optical axis direction (Z-axis direction) or may have an adjusted distance to perform an auto focusing (AF) function or a zoom function. Alternatively, the camera module 10 may move each lens barrel 31, 32 or 33 to perform an optical image stabilization function.

The lens module 30 may include the fixed lens barrel 31 fixed to the housing 20 and the moving lens barrels 32 and 33 moved based on the housing 20. The lens module 30 may include one or more moving lens barrels 32 and 33.

An image sensor module including an image sensor that converts light passing through the lens module to an electrical signal may be disposed at the rear of the lens module. The image sensor module 40 may further include an optical filter (not shown) filtering light that passes through the lens module 30 and is then incident thereto.

In the camera module 10 according to an example embodiment, the reflective module 100 may be disposed in front of the lens module 30, and the image sensor module 40 may be disposed in the rear of the lens module 30, based on the lens module 30 in the internal space of the housing 20. Accordingly, incident light incident from the external subject of the camera module 10 may sequentially pass through the reflective module 100 and the lens module 30 to be incident on the image sensor module 40.

The image sensor module 40 may be electrically connected to a printed circuit board 50 to convert image information to the electrical signal and then transmit the same outward from the camera module 10.

Meanwhile, the camera module 10 in an example embodiment may be formed by coupling a reflective module assembly including the reflective module 100 and a lens module assembly disposed adjacent to the reflective module assembly to each other. For example, the reflective module assembly may include the above-described reflective module 100 and a housing having the internal space accommodating the reflective module 100 to be moved therein. The lens module assembly may include the lens module 30, the image sensor module 40 and a housing having the internal space to accommodate these components. The housing of the reflective module assembly and the housing of the lens module assembly may be formed integrally with each other or may be provided as separate housings. In this case, the separate housings may be coupled to each other to entirely form the housing of the camera module 10.

For convenience of explanation, the following description describes the reflective module 100 as a component included in the camera module 10. However, as described above, the reflective module 100 according to an example embodiment may be viewed as being included in the reflective module assembly, and the following description of the reflective module 100 and the housing 20 accommodating the reflective module 100 may be equally applied to a reflective module assembly according to another example embodiment.

In an example embodiment, the reflective module 100 may be accommodated in the housing 20 of the camera module 10 to change the path of the incident light. For example, as shown in FIG. 2, the reflective module 100 may be accommodated in the housing 20 to be adjacent to the lens module 30, and change the path of the incident light incident in a height direction (e.g., Y-axis direction) of the camera module 10 to be in the optical axis direction (e.g., Z-axis direction) of the lens module 30.

In an example embodiment, the reflective module 100 may include the reflective member 120 which may change the path of light, a reflective holder 110 supporting the reflective member 120, and a drive unit 130 moving the reflective holder 110.

The reflective member 120 of the reflective module 100 may refract or reflect the incident light to change the propagation path of light. For example, the propagation path of light incident on the reflective member 120 in the first direction (Y-axis direction) may be changed to be in the second direction (Z-axis direction) intersecting the first direction by the reflective member 120. The reflective member 120 may reflect or refract the incident light. For example, the reflective member 120 may change the propagation path of light incident from the external subject to be in the optical axis direction (e.g., Z-axis direction) of the lens module 30. The reflective member 120 may be a mirror or a prism, which reflects light, and is not limited thereto, and may be anything which may change the path of light (however, for convenience of explanation, the following description assumes that the reflective member 120 has a shape of the prism).

The reflective holder 110 may support the reflective member 120 to be moved. That is, the reflective member 120 may be supported by the reflective holder 110 and may be moved within a predetermined range. For example, the reflective holder 110 may be rotated about the rotation axis (e.g., axis parallel to an X axis) passing through the reflective holder 110 or may reciprocate within a certain range. Accordingly, the reflective member 120 supported by the reflective holder 110 may be rotated or reciprocate based on the movement of the reflective holder 110.

The drive unit 130 moving the reflective holder 110 may be disposed on at least a partial surface of the reflective holder 110. For example, as shown in FIG. 2, the drive unit 130 may be disposed at each of two ends of the reflective holder 110 in one direction (e.g., X-axis direction). The drive unit 130 may be an electromagnetic actuator including a magnet (e.g., 131 in FIG. 3) and a coil (e.g., 132 in FIG. 3), and is not limited thereto, and may be anything which may move the reflective holder 110 in a predetermined range.

Meanwhile, the reflective module 100 in an example embodiment may further include a position detection unit (not shown) detecting an amount of the movement of the reflective holder 110.

The reflective module 100 may perform the optical image stabilization function by rotating or moving the reflective holder 110 and the reflective member 120 supported by the reflective holder 110 in the housing 20 using a driving force generated by the drive unit 130.

The reflective holder 110 may be moved, and the reflective holder 110 may thus collide with another member adjacent to the reflective module 100 while being moved. For example, when disposed in the housing 20 of the camera module 10, the reflective module 100 according to an example embodiment may collide with an inner wall of the housing 20 while being moved in the housing 20. In addition, when the camera module 10 or the housing 20 is shaken up, down, left, and right in a state in which power is not applied to the drive unit 130, the reflective module 100 disposed in the housing 20 may be relatively moved based on the inside of the housing 20 and irregularly collide with an inner surface of the housing 20. There may be a risk in which the reflective module 100 is damaged due to an impact caused by such a collision, or noise (or joint noise) occurs due to the collision.

In order to prevent the risk of damage or noise as described above, the reflective module 100 according to an example embodiment may further include a damping member.

Figure 4:
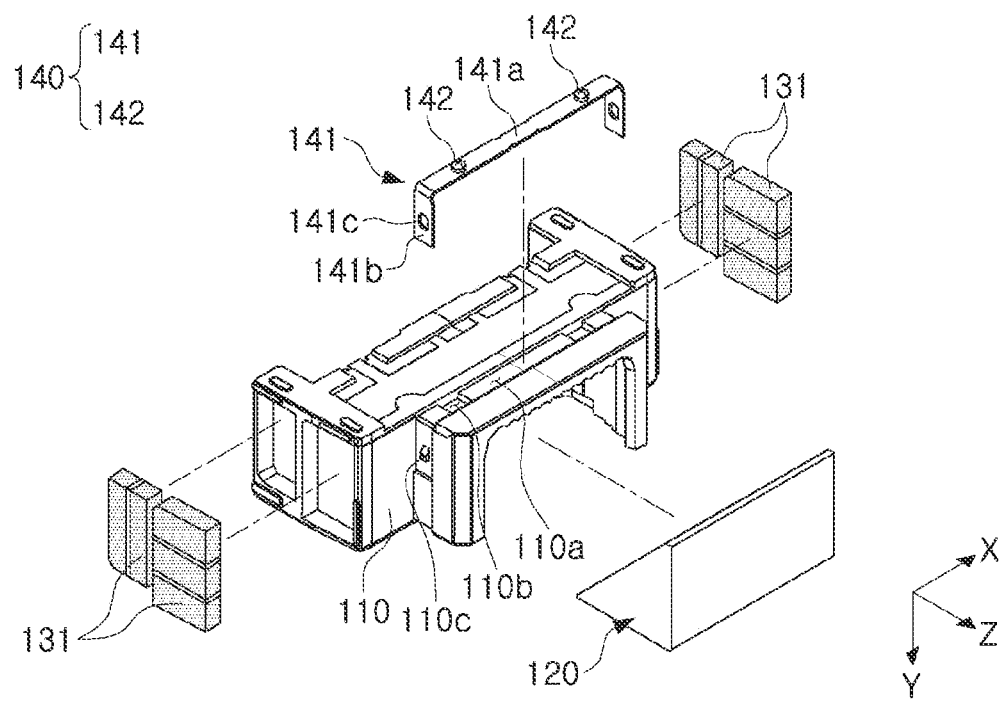
FIG. 4 is an exploded perspective view of the reflective module according to an example embodiment.
Figure 5:
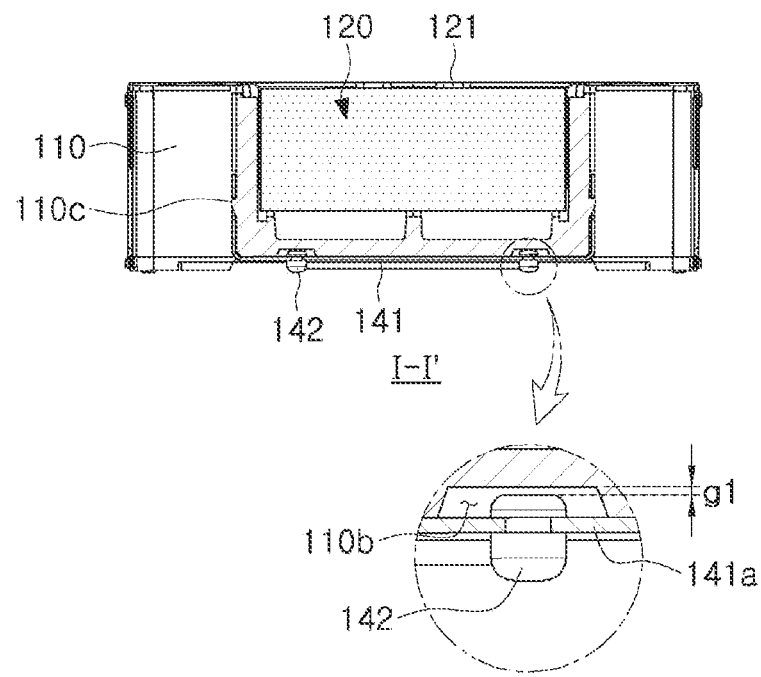
FIG. 5 is a cross-sectional view taken along line I-I' of FIG. 3.

Hereinafter, the description describes the reflective module 100 according to an example embodiment and the reflective module assembly including the reflective module 100 in detail with reference to FIGS. 3 through 5.

Figure 3:
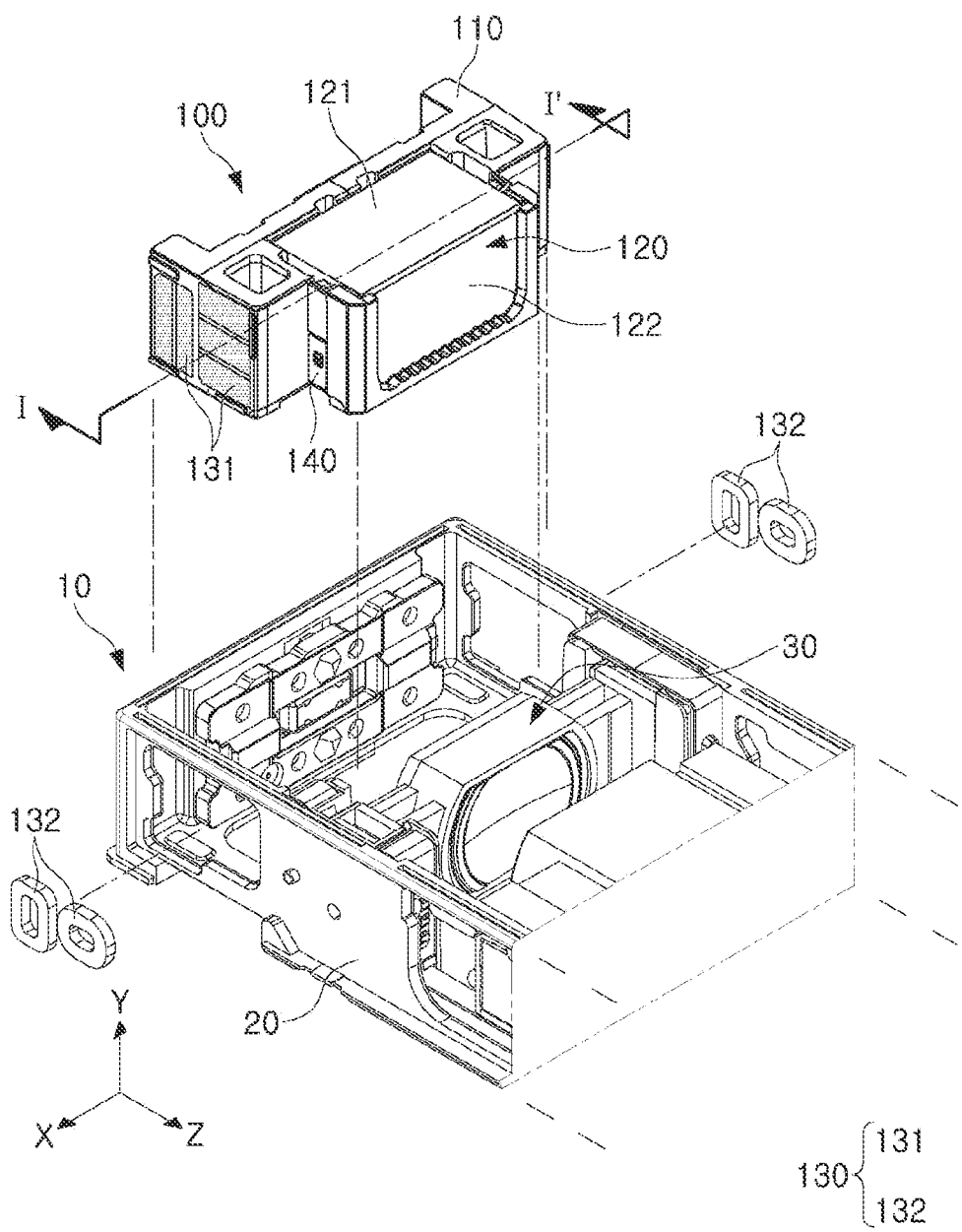
FIG. 3 is an exploded perspective view of a housing and a reflective module in the camera module according to an example embodiment.

FIG. 3 is an exploded perspective view of the housing 20 and the reflective module 100 in the camera module 10 according to an example embodiment; FIG. 4 is an exploded perspective view of the reflective module 100 according to an example embodiment; and FIG. 5 is a cross-sectional view taken along line I-I' of FIG. 3. The reflective module 100 described in FIGS. 3 through 5 includes the features of the reflective module 100 described in FIGS. 1 and 2, and a redundant description is omitted.

The reflective module 100 according to an example embodiment may include the reflective member 120 which may change the path of light, the reflective holder 110 supporting the reflective member 120, the drive unit 130 moving the reflective holder 110, and a damping member 140 which may absorb the impact applied to the reflective module 100.

The reflective member 120 may include an incident surface 121 and an exit surface 122, and refract or reflect light incident on the incident surface 121 to change the progression path of light toward the exit surface 122 and the lens module 30 disposed on the rear thereof.

The drive unit 130 may include the magnet 131 disposed on the reflective holder and the coil 132 disposed to face the magnet 131. However, the drive unit 130 is not limited to including these components, and may include anything which may move the reflective module.

The damping member 140 according to an example embodiment may be disposed on at least a partial surface of the reflective holder 110 to protect the reflective module 100 from the external impact. For example, the damping member 140 may be disposed on a lower surface of the reflective holder 110 and disposed between the reflective holder 110 and the housing 20 when the reflective holder 110 is mounted in the housing 20. Accordingly, the damping member 140 may first come into contact with a lower surface of the housing 20 while the reflective module 100 is rotated or moved in the housing 20, thereby absorbing the impact to reduce energy of the impact transmitted to the reflective holder 110 or the reflective member 120.

In an example embodiment, the damping member 140 may include at least one first damper 142 and a damper holder 141 fixing the first damper 142 to the reflective holder 110.

The damper holder 141 may be coupled to the reflective holder 110 while supporting the first damper 142, and serve to fix the first damper 142 to the reflective holder 110. For example, as shown in FIG. 4, the damper holder 141 may include a first extension portion 141a on which the first damper 142 is disposed, and a fastening portion 141b disposed at each of two ends of the first extension portion 141a. Here, the fastening portion 141b may be fastened to each of the two ends of the reflective holder 110 to fix the damper holder 141 to the reflective holder 110.

In an example embodiment, the first extension portion 141a of the damper holder 141 may be extended from the lower surface of the reflective holder 110 in the width direction (e.g., X-axis direction) of the reflective holder 110, and the fastening portion 141b of the damper holder 141 may be extended from each of the two ends of the first extension portion 141a in the height direction (e.g., positive Y-axis direction) of the reflective holder 110.

In an example embodiment, the first extension portion 141a of the damper holder 141 may be extended across a lower surface of a portion of the reflective holder 110, accommodating the reflective member 120. The first extension 141a on which the first damper 142 is disposed may be disposed under the reflective member 120, which has a relatively large load among the components of the reflective module 100, thus increasing a damping effect when the reflective module 100 collides with a lower surface of the housing 20.

An insertion portion 110a having a shape corresponding to a shape of the damper holder 141 may be disposed in the reflective holder 110 so that at least a portion of the damper holder 141 may be inserted thereinto in the thickness direction. The insertion portion 110a may be a groove portion having a depth corresponding to a thickness of the damper holder 141. The first extension portion 141a may be in contact with the insertion portion 110a of the reflective holder 110. Accordingly, when the damper holder 141 is inserted into the insertion portion 110a, the lower surface of the reflective holder 110 and an outer surface of the damper holder 141 may be connected flat to each other.

In an example embodiment, a distance between the two fastening portions 141b disposed on the damper holder 141 may be equal to or less than a length of the insertion portion 110a of the reflective holder 110. Accordingly, when the damper holder 141 is fastened to the reflective holder 110, the fastening portions 141b of the damper holder 141 may press the reflective holder 110 in opposite directions to firmly fix the damper holder 141.

A fastening groove 141c may be disposed in the fastening portion 141b of the damper holder 141, and in response thereto, the reflective holder 110 may include a fastening protrusion 110c protruding toward the damper holder 141 to be inserted into the fastening groove 141c. The fastening groove 141c and the fastening protrusion 110c may be engaged with each other, thereby preventing the damper holder 141 from falling off from the reflective holder 110. On the contrary, the fastening protrusion may be disposed on the fastening portion 141b of the damper holder 141, and the reflective holder 110 may include the fastening groove into which the fastening protrusion is inserted in a portion facing the fastening protrusion based on a side surface of the reflective holder 110.

In an example embodiment, the damper holder 141 may be formed of an elastic material. For example, the damper holder 141 may be formed of a metallic material or a resin material having elasticity, and accordingly, the damper holder 141 may be inserted and fastened to the reflective holder 110 in a clip type. For example, the damper holder 141 may be a member formed of the elastic material which may constantly maintain the distance between the two fastening portions 141b, and may be inserted and fastened to the lower surface of the reflective holder 110 in the height direction (e.g., positive Y-axis direction).

The damper holder 141 may include at least one first damper 142 protruding in a lower direction (e.g., negative Y-axis direction) of the reflective holder 110.

In an example embodiment, at least one first damper 142 may be coupled to the reflective holder 110 through the damper holder 141. That is, the first damper 142 may be fixed to the reflective holder 110 by being connected to the damper holder 141 rather than being directly coupled to the reflective holder 110.

The first damper 142 may be fixed to the damper holder 141. For example, the first damper 142 may be fixed to the damper holder 141 using an adhesive. Alternatively, the first damper 142 may be inserted into a through hole (not shown) disposed in the damper holder 141.

The first damper 142 may protrude from the damper holder 141 in a direction perpendicular to the incident surface 121 of the reflective member 120 of the reflective module 100. For example, as shown in FIG. 5, the first damper 142 may protrude from the lower surface of the reflective module 100 in the direction (e.g., negative Y-axis direction) perpendicular to the incident surface 121 of the reflective member 120.

In an example embodiment, the first damper 142 may protrude from the reflective holder 110 in a direction (e.g., Y-axis direction in FIG. 2) intersecting the optical axis direction (e.g., Z-axis direction in FIG. 2) of the lens module (e.g., 30 in FIG. 2) adjacent to the reflective module 100.

In an example embodiment, one or more first dampers 142 may be disposed on the damper holder 141. For example, as shown in FIG. 4, the plurality of first dampers 142 may be disposed on the damper holder 141 in a length direction (e.g., X-axis direction). When two first dampers 142 are disposed, the first dampers 142 may be symmetrically disposed on the damper holder 141, and when three or more first dampers 142 are disposed, the first dampers 142 may be arranged on the reflective holder 110 while being spaced apart from one another by a predetermined distance. When the plurality of first dampers 142 are disposed, the distance between the first dampers 142 may be equal to or less than a width of the reflective member 120. Accordingly, at least one of the plurality of first dampers 142 may be disposed directly below the reflective member 120.

In an example embodiment, a first damper groove 110b accommodating at least a portion of the first damper 142 may be disposed in the lower surface of the reflective holder 110. The first damper groove 110b may be a portion recessed to a predetermined depth at a position of the lower surface of the reflective holder 110, facing the first damper 142. The first damper groove 110b may be disposed in a partial surface of the insertion portion 110a of the reflective holder 110.

A first damping gap g1 may be formed between the first damper groove 110b and the first damper 142 as a separation space. For example, as shown in FIG. 5, a portion of the first damper 142 may be accommodated in the first damper groove 110b of the reflective holder 110, and the first damping gap g1 may be formed between the first damper 142 and the first damper groove 110b as the separation space. The first damping gap g1 may be a space formed when the first damper 142 and the reflective holder 110 are spaced apart from each other in the direction perpendicular to the incident surface 121. In the reflective module 100 according to an example embodiment, the first damper 142 may be coupled to the reflective holder 110 through the damper holder 141 rather than being directly disposed on the reflective holder 110, and it may thus be easy to form the first damping gaps g1 and maintain the distance therebetween.

The first damper 142 may first collide with another fixture of the camera module 10 or reflective module assembly while the reflective holder 110 is moved, thereby absorbing the energy of the impact caused by the collision. For example, the first damper 142 may first collide with the lower surface of the housing 20 among the components of the reflective module 100 while the reflective holder 110 is rotated toward the lower surface of the housing 20.

The first damper 142 may be formed of the material having a predetermined elasticity to absorb the impact applied to the reflective module 100, and may include, for example, urethane, silicone, porous rubber, foamed resin, epoxy, or poly material.

The first damping gap g1 may be formed between the first damper 142 and the reflective holder 110, and thus buffer the impact applied to the first damper 142 while the reflective holder 110 collides with another component of the camera module 10 or the reflective module assembly, thereby further reducing an amount of the impact transmitted to the reflective holder 110.

In an example embodiment, an end of the first damper 142 may have a shape of a hemisphere. However, the end of the first damper 142 is not limited to this shape, and for example, the first damper 142 may have any of various shapes such as a square pole, a circular pole, a triangular pole, and a triangular pyramid.

The reflective module 100 according to an example embodiment may include a second damper (e.g., 143 in FIGS. 6 through 9) disposed at a position different from that of the first damper 142. The second damper may be disposed on the damper holder to absorb the impact occurring in any of various directions. Hereinafter, the description describes the reflective module including the second damper with reference to FIGS. 6 through 9.

Figure 6:
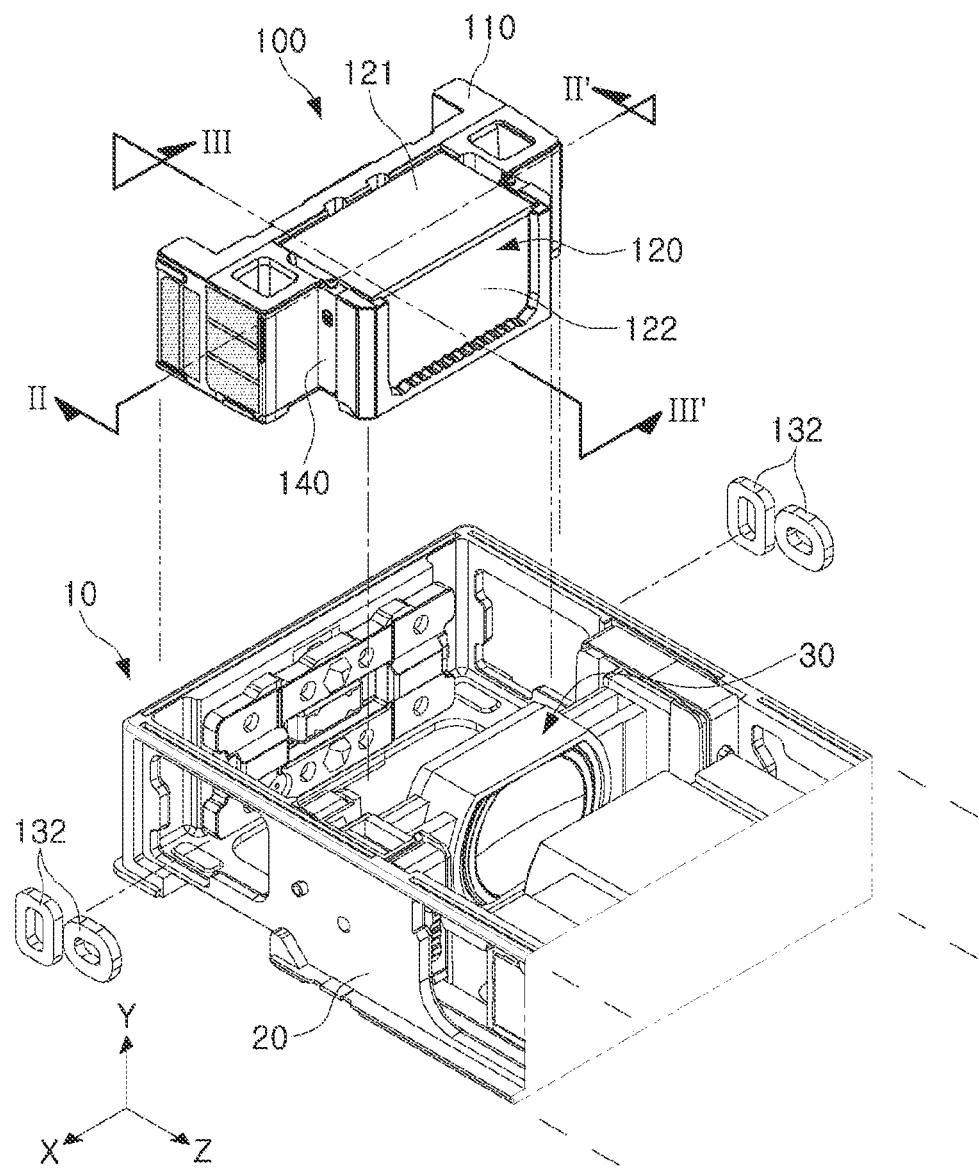
FIG. 6 is an exploded perspective view of the housing and the reflective module in the camera module according to an example embodiment.
Figure 7:
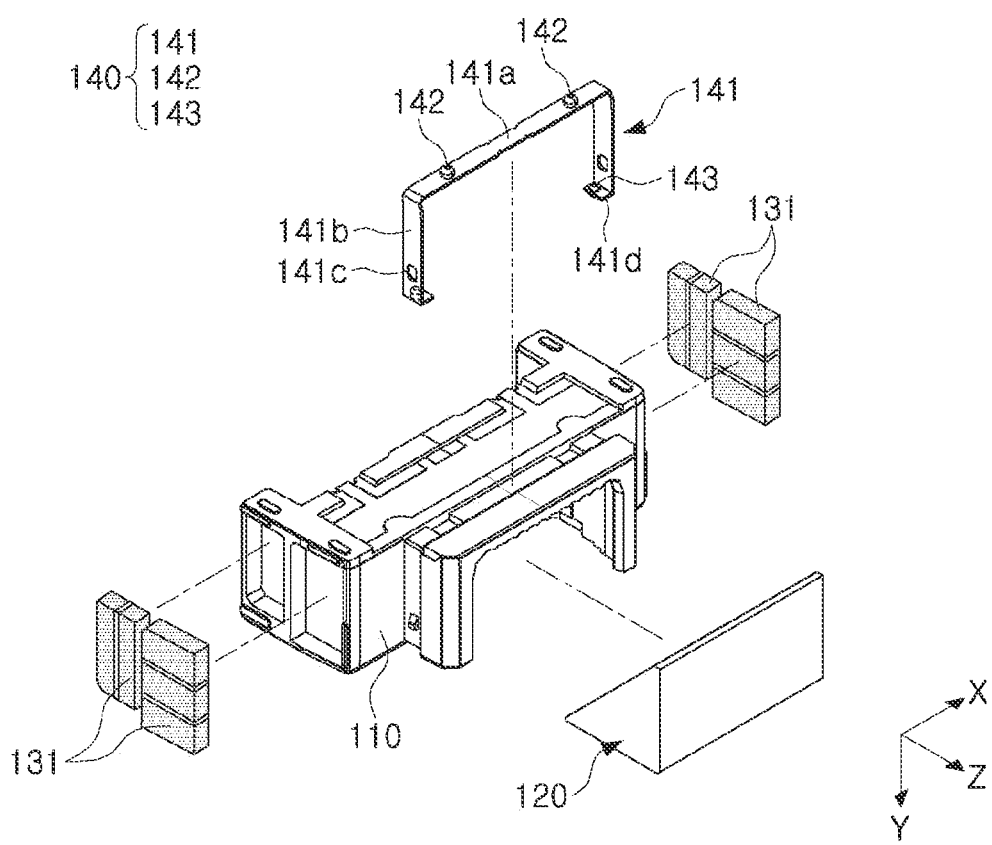
FIG. 7 is an exploded perspective view of the reflective module according to an example embodiment.
Figure 8:
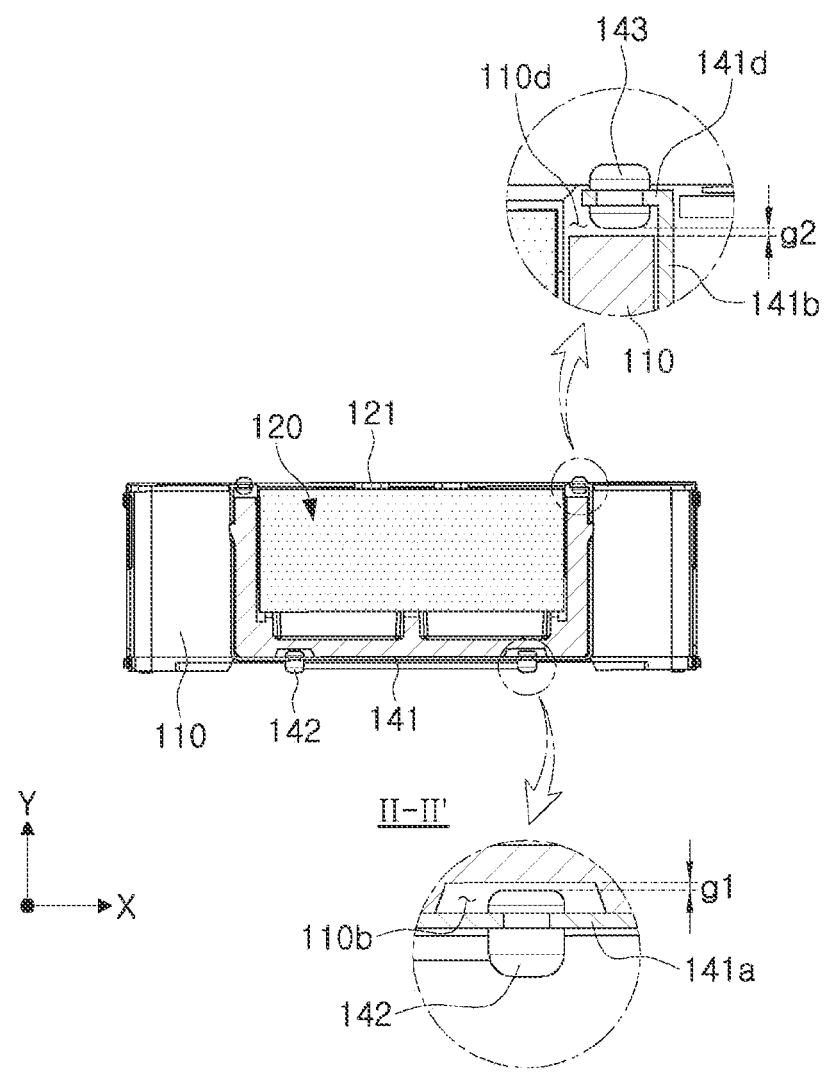
FIG. 8 is a cross-sectional view taken along line II-II' of FIG. 6.
Figure 9:
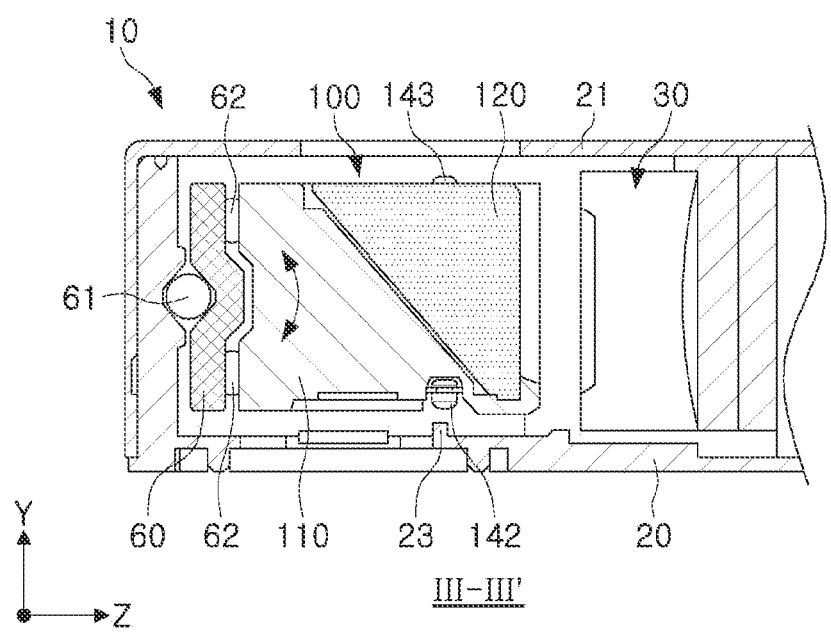
FIG. 9 is a cross-sectional view taken along line III-III' of FIG. 6 in a state in which the reflective module is inserted into the housing.

FIG. 6 is the exploded perspective view of the housing 20 and the reflective module 100 in the camera module 10 according to an example embodiment; FIG. 7 is the exploded perspective view of the reflective module 100 according to an example embodiment; FIG. 8 is a cross-sectional view taken along line II-II' of FIG. 6; and FIG. 9 is a cross-sectional view taken along line III-III' of FIG. 6 in a state in which the reflective module 100 is inserted into the housing 20. The reflective module 100 described with reference to FIGS. 6 through 9 may include the features of the reflective module 100 described with reference to FIGS. 3 through 5 above. That is, the reflective module 100 may include the reflective member 120 and the reflective holder 110 supporting the reflective member, and the reflective holder 110 may be coupled to the damper holder 141 on which the first damper 142 is disposed.

The damping member 140 disposed on the reflective module 100 according to an example embodiment may include at least one second damper 143 and the damper holder 141 fixing the second damper 143 to the reflective holder 110.

The damper holder 141 may include at least one second damper 143 protruding in an upper direction (e.g., positive Y-axis direction) of the reflective holder 110. The second damper 143 may protrude from a position different from that of the first damper 142 described above in a different direction, and thus absorb the impact occurring in a different direction from that of the first damper 142.

In an example embodiment, at least one second damper 143 may be coupled to the reflective holder 110 through the damper holder 141. That is, the second damper 143 may be fixed to the reflective holder 110 by being connected to the damper holder 141 rather than being directly coupled to the reflective holder 110. That is, the damper holder 141 may be coupled to the reflective holder 110 while supporting the second damper 143, and serve to fix the second damper 143 to the reflective holder 110.

In an example embodiment, the damper holder 141 may include second extension portions 141d respectively extended from ends of the fastening portions 141b along an upper surface of the reflective holder 110 in opposite directions, and the second damper 143 may be fixed to the second extension portion 141d.

In an example embodiment, the second extension portions 141d of the damper holder 141 may respectively be extended from ends of the two fastening portions 141b along the upper surface of the reflective holder 110 in the width direction (e.g., X-axis direction) of the reflective holder 110. The second extension portions 141d respectively extended from the ends of the two fastening portions 141b in the opposite directions may be spaced apart from each other by a distance corresponding to the width of the reflective member 120 or more. Accordingly, the incident surface 121 of the reflective member 120, disposed between the second extension portions 141d, may not be covered by the second extension portion 141d.

The second damper 143 may be fixed to the second extension portion 141d of the damper holder 141. For example, the second damper 143 may be fixed to the damper holder 141 using the adhesive. Alternatively, the second damper 143 may be inserted into a through hole (not shown) disposed in the second extension portion 141d of the damper holder 141.

The second damper 143 may protrude from the damper holder 141 in a direction perpendicular to the incident surface 121 of the reflective member 120 of the reflective module 100. For example, as shown in FIG. 6, the second damper 143 may protrude from an upper surface of the reflective module 100 in the direction (e.g., positive Y-axis direction) perpendicular to the incident surface 121 of the reflective member 120. In this case, the second damper 143 may protrude from the reflective holder 110 in the direction opposite to that of the first damper 142.

In an example embodiment, the second damper 143 may protrude from the reflective holder 110 in the direction (e.g., Y-axis direction in FIG. 2) intersecting the optical axis direction (e.g., Z-axis direction in FIG. 2) of the lens module (e.g., 30 in FIG. 2) adjacent to the reflective module 100.

In an example embodiment, one or more second dampers 143 may be disposed on the damper holder 141. When two second dampers 143 are disposed, the second dampers 143 may be symmetrically disposed on the damper holder 141.

In an example embodiment, a second damper groove 110d accommodating at least a portion of the second damper 143 may be disposed in the upper surface of the reflective holder 110. The second damper groove 110d may be a portion recessed to a predetermined depth at a position of the upper surface of the reflective holder 110, facing the second damper 143.

A second damping gap g2 may be formed between the second damper groove 110d and the second damper 143 as a separation space. For example, as shown in FIG. 8, a portion of the second damper 143 may be accommodated in the second damper groove 110*d* of the reflective holder 110, and the second damping gap g2 may be formed between the second damper 143 and the second damper groove 110*d* as the separation space. The second damping gap g2 may be a space formed when the second damper 143 and the reflective holder 110 are spaced apart from each other in the direction perpendicular to the incident surface 121. In the reflective module 100 according to an example embodiment, the second damper 143 may be coupled to the reflective holder 110 through the damper holder 141 rather than being directly disposed on the reflective holder 110, and it may thus be easy to form the second damping gaps g2 and maintain the distance therebetween.

The second damper 143 may first collide with another fixture of the camera module 10 or reflective module assembly while the reflective module 100 is moved in the upper direction (e.g., positive Y-axis direction), thereby absorbing the energy of the impact caused by the collision. For example, the second damper 143 may first collide with the upper cover 21 of the camera module 10 among the components of the reflective module 100. The second damper 143 may be formed of a material having a predetermined elasticity to absorb the impact applied to the reflective module 100, and may include, for example, the same material as that of the first damper 142.

The second damping gap g2 may be formed between the second damper 143 and the reflective holder 110, and thus buffer the impact applied to the second damper 143 while the reflective holder 110 collides with another component of the camera module 10, thereby further reducing an amount of the impact transmitted to the reflective holder 110.

In an example embodiment, an end of the second damper 143 may have the shape of a hemisphere. However, the end of the second damper 143 is not limited to this shape, and may have, for example, any of various shapes like the first damper 142.

Referring to FIG. 9, the description describes the rotation of the reflective module 100 according to an example embodiment.

The reflective module 100 according to an example embodiment may be accommodated in the internal space of the housing 20, and moved based on the housing 20. For example, as shown in FIG. 9, the reflective module 100 may be supported by the guide member 60 to be rotated or linearly moved toward the upper or lower portion of the housing 20. A plurality of ball members 61 and 62 forming the rotation axis of the reflective module 100 may be disposed between the guide member 60 and the housing 20 or between the guide member 60 and the reflective holder 110. For example, as shown in FIG. 9, the first ball member 61 may form a first rotation axis and the second ball member 62 may form a second rotation axis approximately perpendicular to the first rotation axis.

The reflective module 100 according to an example embodiment may receive light outside of the camera module 10 using the incident surface 121 of the reflective member 120 to change the propagation path of light. The reflective module 100 may change an angle of the incident surface 121 by moving or rotating the reflective member 120, and include the first damper 142 and/or the second damper 143 in order to protect the reflective member 120 from the impact occurring during this movement or rotation.

The first damper 142 and the second damper 143 according to an example embodiment may protrude in the direction perpendicular to the incident surface 121 of the reflective member 120. For example, as shown in FIG. 9, the first damper 142 may protrude in the direction perpendicular to the incident surface 121 of the reflective member 120 and toward a lower surface of the camera module 10 (e.g., negative Y-axis direction), and the second damper 143 may protrude in the direction perpendicular to the incident surface 121 of the reflective member 120 and toward an upper surface of the camera module 10 (e.g., a positive Y-axis direction).

In an example embodiment, the first damper 142 and the second damper 143 may first come into contact with the upper or lower surface of the camera module 10 as the reflective module 100 is moved in the housing 20. For example, the first damper 142 may first come into contact with the lower surface of the housing 20 while the reflective module 100 is moved toward the lower surface of the housing 20. Alternatively, the second damper 143 may first come into contact with the upper cover 21 while the reflective module 100 is moved toward the upper portion of the housing 20.

In an example embodiment, a protrusion 23 protruding in the height direction of the housing 20 toward the first damper 142 may be disposed on the lower surface of the housing 20. One or more protrusions 23 may be disposed to correspond to the number of the first damper 142.

In an example embodiment, the protrusion 23 may be formed of the same material as that of the first damper 142. That is, the protrusion 23 may include the elastic material, for example, urethane, silicone, porous rubber, foamed resin, epoxy, or poly material. However, the protrusion 23 is not limited to this material, and for example, the protrusion 23 may be formed of the same material as that of the housing 20.

The protrusion 23 may be disposed to face the first damper 142. Therefore, when the reflective module 100 is moved or rotated toward the lower surface of the housing 20, the first damper 142 of the reflective module 100 may first collide with the protrusion 23 disposed on the lower surface of the housing 20, thereby absorbing the impact. The protrusion 23 of the housing 20 according to an example embodiment may serve as a stopper for limiting a maximum rotation radius of the reflective module 100.

As the first damper 142 may be in contact with the protrusion 23, a sufficient free space may be secured between the reflective holder 110 and the lower surface of the housing 20 even when the reflective holder 110 is moved closer to the lower surface of the housing 20. Accordingly, it is possible to prevent the reflective holder 110 and the reflective member 120 from directly colliding with the lower surface of the housing 20.

FIGS. 6 through 9 show that the reflective module 100 includes both the first damper 142 and the second damper 143. However, any one of the dampers may be omitted. For example, the reflective module 100 may include only the second damper 143.

Figure 10:
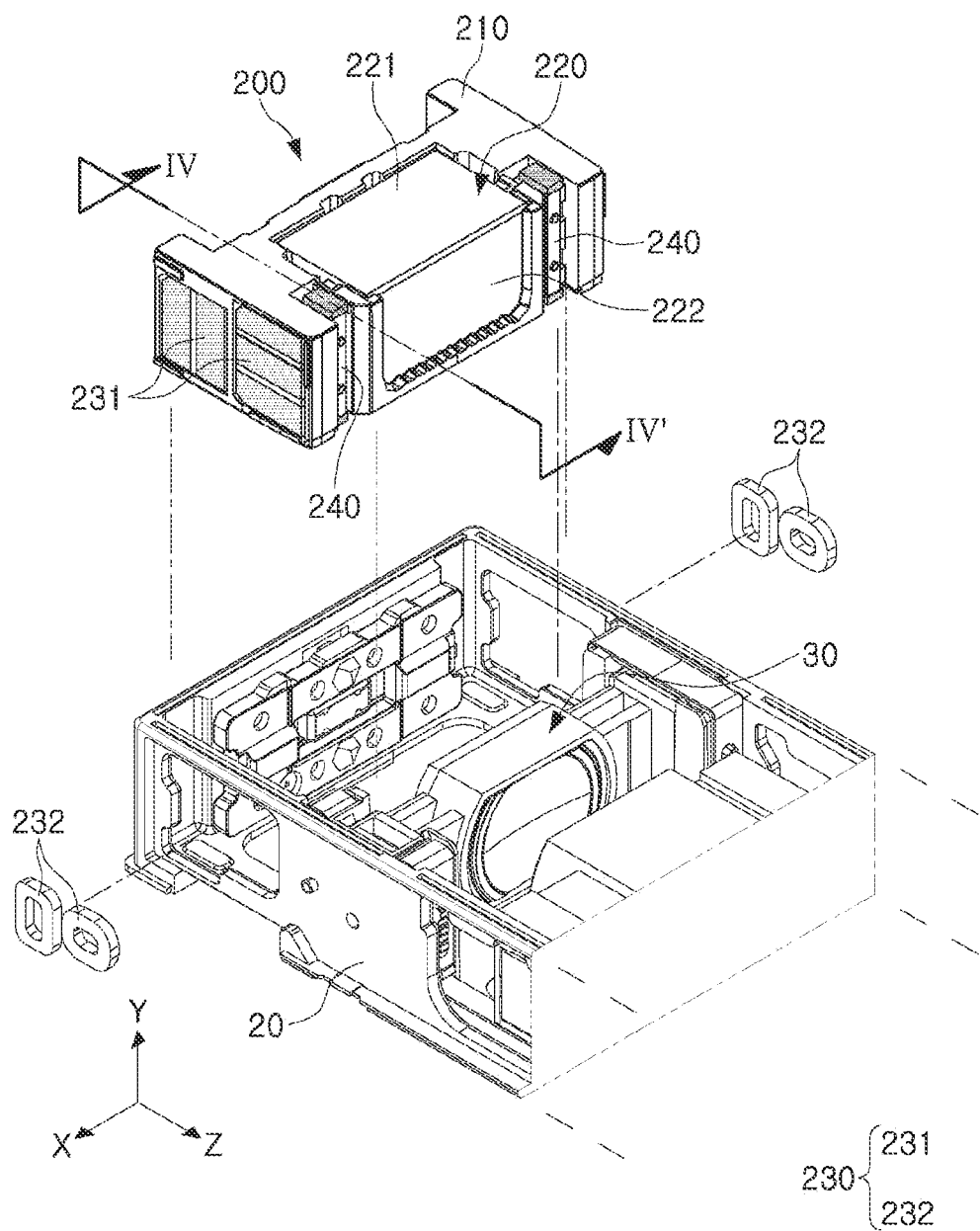
FIG. 10 is an exploded perspective view of the housing and a reflective module in the camera module according to another example embodiment.
Figure 11:
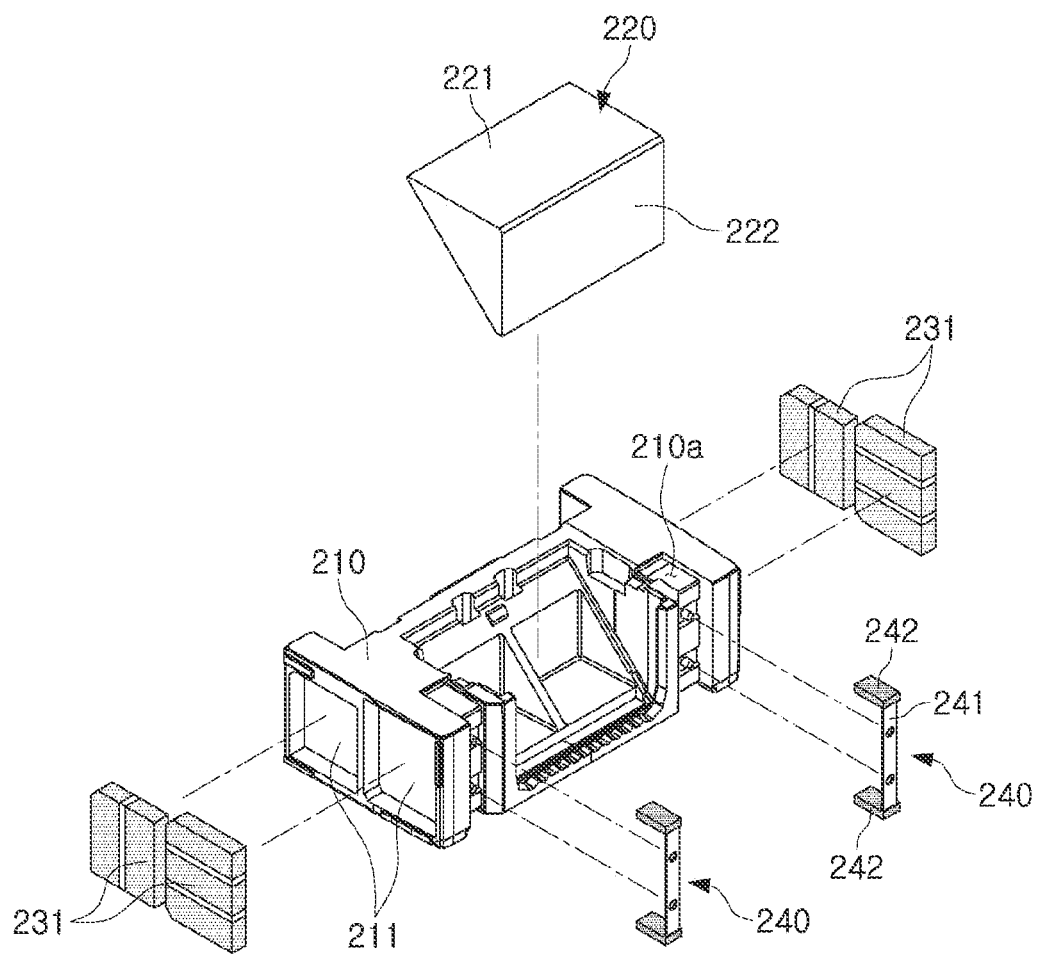
FIG. 11 is an exploded perspective view of the reflective module according to another example embodiment.

Hereinafter, the description describes a reflective module 200 according to another example embodiment with reference to FIGS. 10 through 12. FIG. 10 is an exploded perspective view of the housing 20 and the reflective module 200 in the camera module 10 according to the other example embodiment; FIG. 11 is an exploded perspective view of the reflective module 200 according to the other example embodiment; and FIG. 12 is a cross-sectional view taken along line IV-IV' of FIG. 10 in a state in which the reflective module 200 is inserted into the housing 20.

Figure 12:
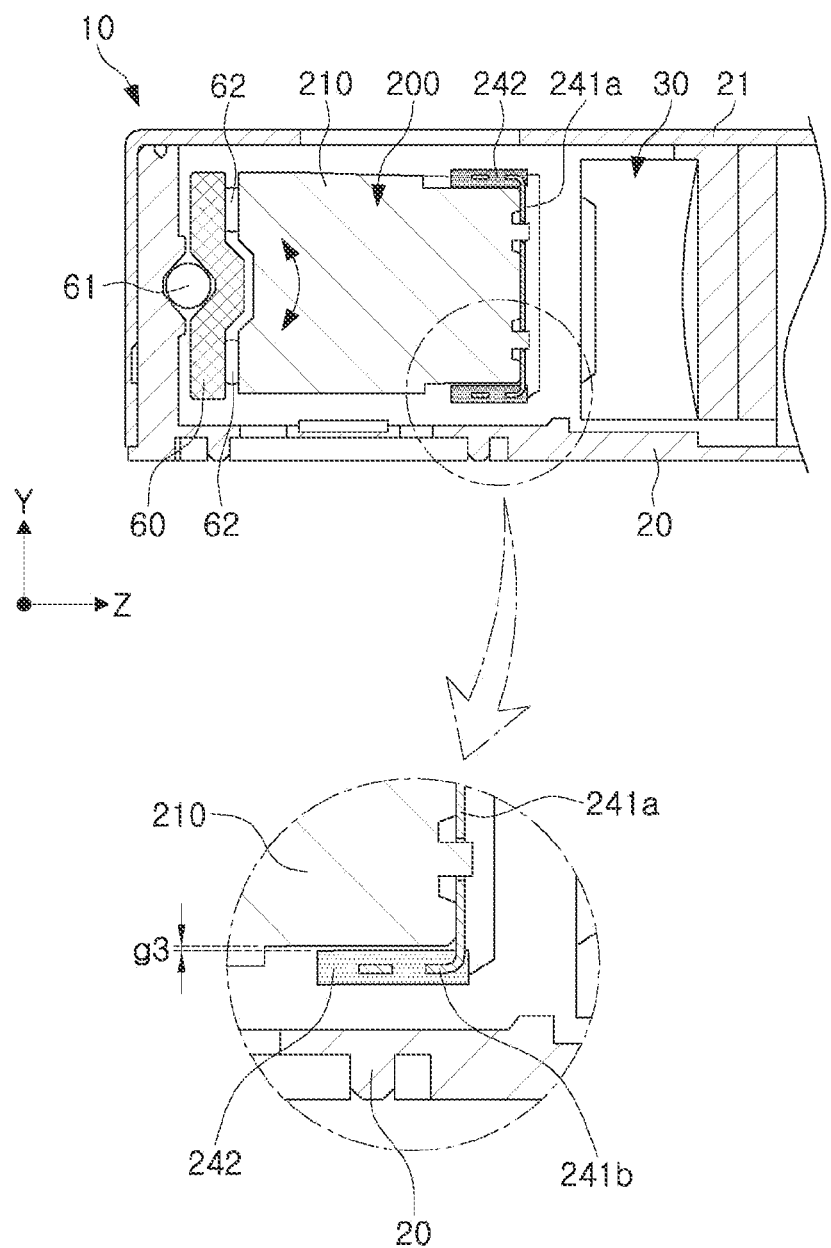
FIG. 12 is a cross-sectional view taken along line IV-IV' of FIG. 10 in a state in which the reflective module is inserted into the housing.

In the reflective module 200 described with respect to FIGS. 10 through 12, features other than a damping member 240 may be the same as those of the reflective module 100 described with respect to FIGS. 1 through 9. For example, the reflective module 200 according to the present example embodiment may change the propagation path of the incident light so that the incident light received by an incident surface 221 of a reflective member 220 is emitted by an exit surface 222 of the reflective member 220. The reflective module 200 according to the present example embodiment may include a drive unit 230 including a magnet 231 and a coil 232, and a reflective holder 210 may include a seating portion 211 in which the magnet 231 is seated. For example, as shown in FIGS. 10 and 11, the seating portion 211 may surround the rest of the magnet 231 except for its surface on which the magnet 231 faces the coil 232. In addition, the reflective module 200 according to the present example embodiment may be included in the reflective module assembly like the reflective module 100 in FIGS. 3 through 9 described above.

The reflective module 200 according to the present example embodiment may include the reflective member 220 and the reflective holder 210 supporting the reflective member 220, and the reflective holder 210 may have the damping member 240 mounted thereon to absorb an impact applied to the reflective module 200.

The damping member 240 may be disposed on at least a partial surface of the reflective holder 210 to protect the reflective module 210 from the external impact.

In the present example embodiment, the damping member 240 may include at least one third damper 242 and a damper holder 241 fixing the third damper 242 to the reflective holder 210.

The damper holder 241 may include at least one third damper 242 protruding in a height direction (e.g., Y-axis direction) of the reflective module 200. For example, the plurality of third dampers 242 may respectively protrude toward the upper and lower portions of the reflective module 200, and thus absorb the impact applied to the upper or lower surface of the reflective module 200.

The damper holder 241 may be coupled to the reflective holder 210 while supporting the third damper 242, and serve to fix the third damper 242 to the reflective holder 210. For example, as shown in FIG. 11 and FIG. 12, the damper holder 241 may include a coupling portion 241a extended parallel to an exit surface 222 of the reflective member 220 and coupled to the reflective holder 210 and a bent portion 241b bent at each of two ends of the coupling portion 241a and extended along the upper or lower surface of the reflective holder 210. The third damper 242 may be coupled and fixed to the bent portion 241b. For example, the third damper 242 may be fixed to the bent portion 241b of the damper holder 241 using the adhesive. Alternatively, the third damper 242 may be inserted into a through hole (not shown) disposed in the bent portion 241b of the damper holder 241 or coupled to the bent portion 241b.

FIGS. 10 through 12 show that the coupling portion 241a of the damper holder 241 is extended in the height direction (e.g., Y-axis direction) of the reflective holder 210, which is only an example, and the damper holder 241 is not limited to this shape. For example, the coupling portion 241a of the damper holder 241 may be extended in a direction transverse to the reflective holder 210 (e.g., X-axis direction).

In the present example embodiment, the damper holder 241 may be formed of the elastic material. For example, the damper holder 241 may be formed of the metallic material or the resin material having elasticity, and accordingly, the damper holder 241 may be inserted and fastened to the reflective holder 210 in the clip type. For example, the damper holder 241 may be a member formed of the elastic material which may constantly maintain the distance between two fastening portions, and may be inserted and fastened to the reflective holder 210 in a direction (e.g., Z-axis direction) horizontal to a direction of the exit surface 222 of the reflective member 220.

In the present example embodiment, the reflective module may include the plurality of damper holders 241. For example, as shown in FIG. 10 and FIG. 11, the reflective module may include two or more damper holders 241, and two or more damper holders 241 may be coupled to the reflective holder 210 interposing the reflective member 220 therebetween to be parallel to each other on both sides of the reflective member 220.

The damper holder 241 may include at least one third damper 242 protruding toward the upper or lower surface of the reflective holder 210. In the present example embodiment, at least one third damper 242 may be coupled to the reflective holder 210 through the damper holder 241. That is, the third damper 242 may be fixed to the reflective holder 210 by being connected to the damper holder 241 rather than being directly coupled to the reflective holder 210.

The third damper 242 may protrude from the reflective holder 210 in a direction perpendicular to an incident surface 221 of the reflective member 220 of the reflective module 200. For example, as shown in FIG. 12, the third damper 242 may protrude from the upper or lower surface of the reflective module 200 in the direction (e.g., Y-axis direction) perpendicular to the incident surface 221 of the reflective member 220.

In the present example embodiment, the third damper 242 may protrude from the reflective holder 210 in the direction (e.g., Y-axis direction in FIG. 2) intersecting the optical axis direction (e.g., Z-axis direction in FIG. 2) of the lens module (e.g., 30 in FIG. 2) adjacent to the reflective module 100.

In the present example embodiment, one or more third dampers 242 may be disposed on the damper holder 241. For example, as shown in FIG. 12, two third dampers 242 may respectively be disposed on the upper and lower surface of the reflective holder 210.

The third damper 242 may be disposed to face a partial surface of the reflective holder 210. In the present example embodiment, a third damper groove 210a accommodating at least a portion of the third damper 242 may be disposed in the partial surface of the reflective holder 210. A third damping gap g3 may be formed between the third damper groove 210a and the third damper 242 as a separation space. For example, as shown in FIG. 12, a portion of the third damper 242 may be accommodated in the third damper groove 210a of the reflective holder 210, and the third damping gap g3 may be formed between the third damper 242 and the third damper groove 210a as the separation space. The third damping gap g3 may be a space formed when the third damper 242 and the reflective holder 210 are spaced apart from each other in the direction perpendicular to the incident surface 221. In the reflective module 200 according to the present example embodiment, the third damper 242 may be coupled to the reflective holder 210 through the damper holder 241 rather than being directly disposed on the reflective holder 210, and it may thus be easy to form the third damping gaps g3 and maintain the distance therebetween.

The third damper 242 may first collide with another fixture of the camera module 10 or reflective module assembly while the reflective holder 210 is moved, thereby absorbing the energy of the impact caused by the collision. For example, the third damper 242 may first collide with the lower surface of the housing 20 among the components of the reflective module 200 while the reflective holder 210 is rotated toward the lower surface of the housing 20.

The third damper 242 may be formed of the material having a predetermined elasticity to absorb the impact applied to the reflective module 200, and may include, for example, urethane, silicone, porous rubber, foam resin, epoxy, or poly material.

The third damping gap g3 may be formed between the third damper 242 and the reflective holder 210, and thus buffer the impact applied to the third damper 242 while the reflective holder 210 collides with another component of the camera module 10, thereby further reducing an amount of the impact transmitted to the reflective holder 210.

In the present example embodiment, the third damper 242 may have a cuboidal shape. However, the third damper 242 is not limited to this shape, and for example, may have any of various shapes such as a square pole, a circular pole, or a polyhedron, or may have a surface more protruding in order to increase the damping effect.

The reflective module 200 according to the present example embodiment may be accommodated in the internal space of the housing 20, and moved based on the housing 20. For example, as shown in FIG. 12, the reflective module 200 may be supported by the guide member 60 to be rotated toward the upper or lower surface of the housing 20.

The reflective module 200 according to the present example embodiment may rotate the reflective holder 210 to perform the auto focusing function or the optical image stabilization function, and include the third damper 242 to protect the reflective member 220 from the impact caused by colliding with the inner surface of the housing 20 during this movement or rotation. For example, as shown in FIG. 12, the third damper 242 may protrude from the reflective holder 210 in the direction (e.g., Y-axis direction) perpendicular to the incident surface 221 of the reflective member 220.

In the present example embodiment, the third damper 242 may first come into contact with the upper or lower surface of the camera module 10 as the reflective module 200 is moved in the housing 20. For example, the third damper 242 may first come into contact with the lower surface of the housing 20 while the reflective module 200 is moved toward the lower surface of the housing 20, and may first come into contact with the upper cover 21 while the reflective module 200 is moved toward the upper portion of the housing 20. Accordingly, the external impact applied to the reflective module 200 may be absorbed by the third damper 242 and the third damping gap g3, and the reflective member 220 or the reflective holder 210 may be prevented from being damaged or deformed by the impact. In addition, most energy of the impact may be absorbed by the third damper 242 and the third damping gap g3, thus suppressing the occurrence of the impact sound or joint noise even when the reflective module 200 collides with the inner wall of the housing.

In another example embodiment, the damping member may be at least a portion of the seating portion in which the magnet is seated. Hereinafter, the description describes the reflective module 300 including a damping member 340 which is at least a portion of the seating portion 311 with reference to FIGS. 13 through 15.

Figure 13:
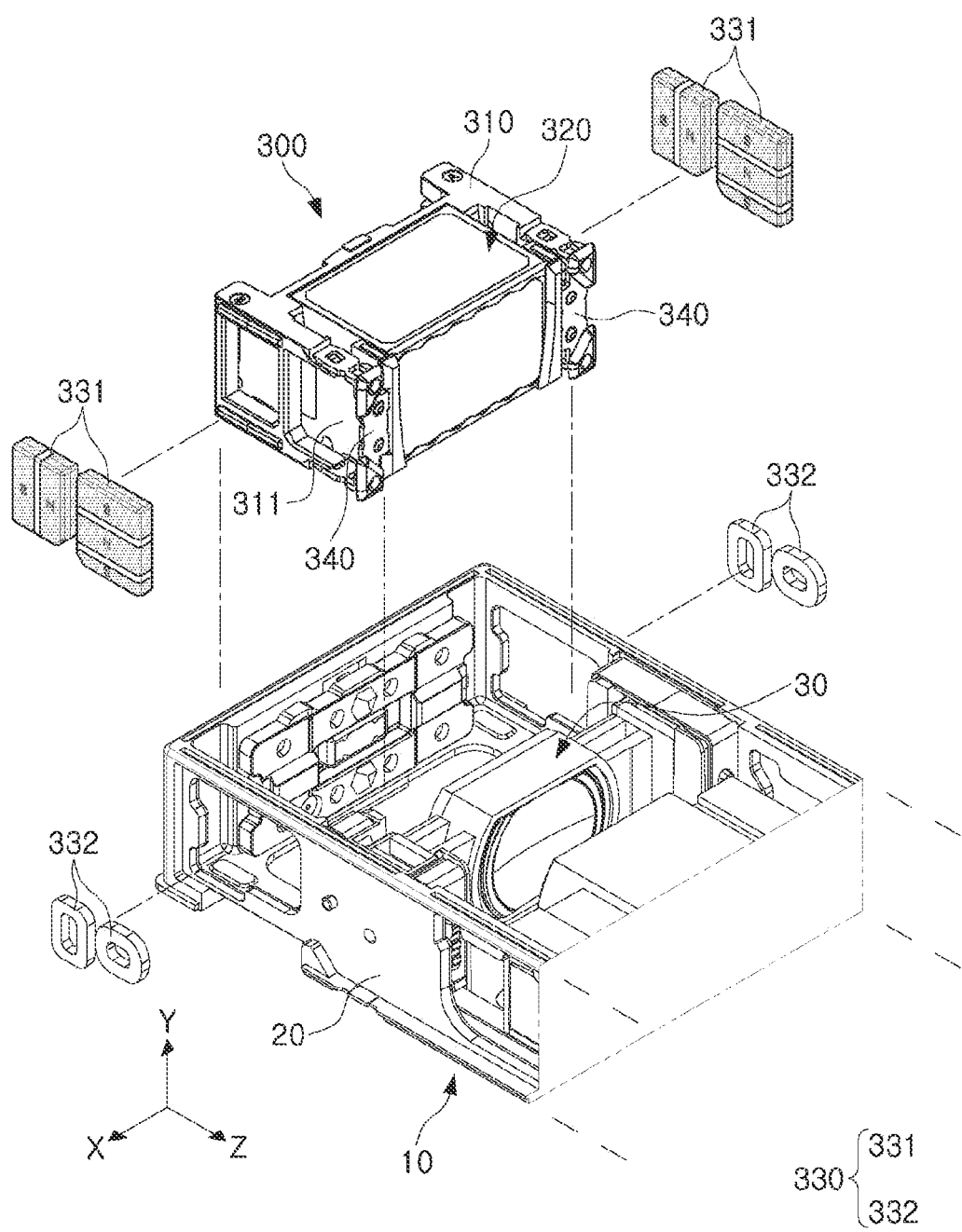
FIG. 13 is an exploded perspective view of the housing and a reflective module in the camera module according to another example embodiment.
Figure 14:
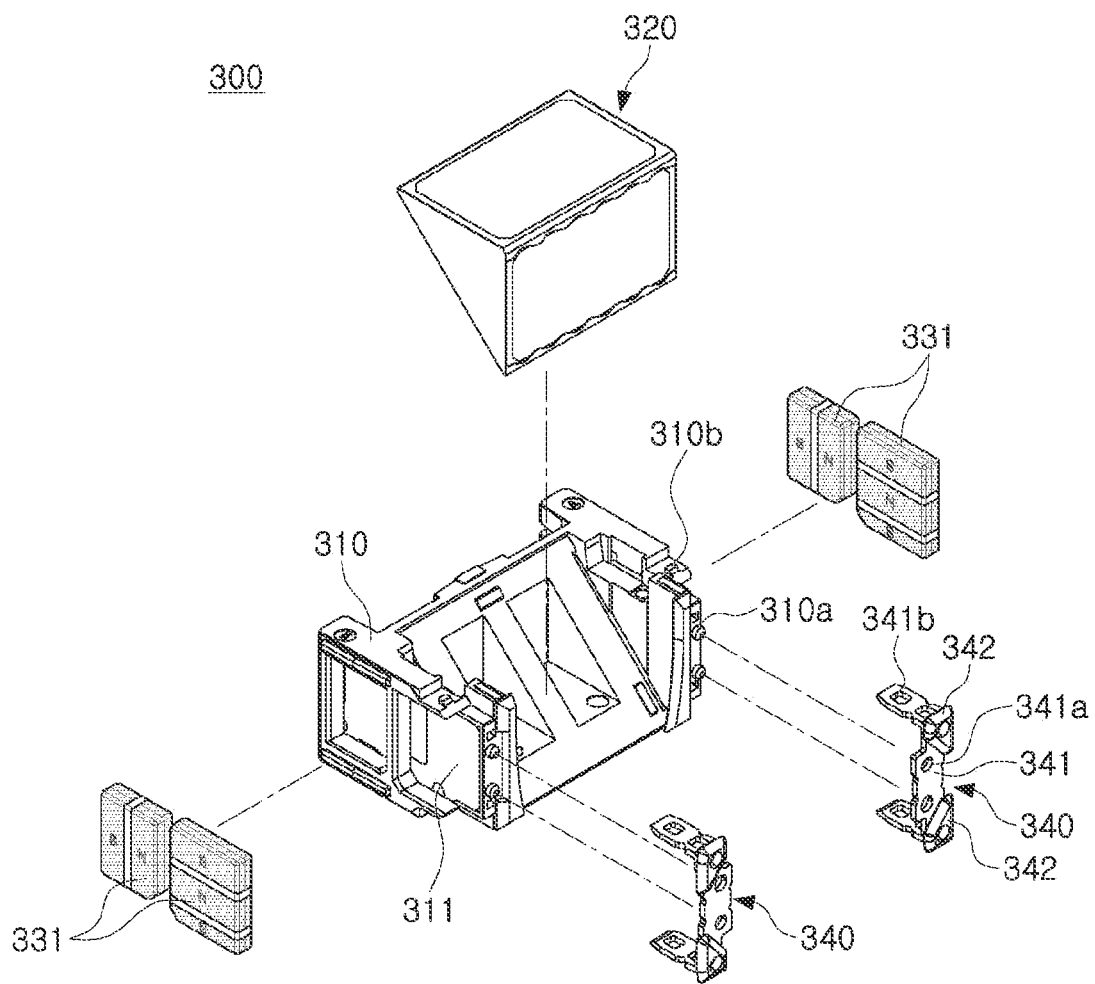
FIG. 14 is an exploded perspective view of the reflective module shown in FIG. 13.
Figure 15:
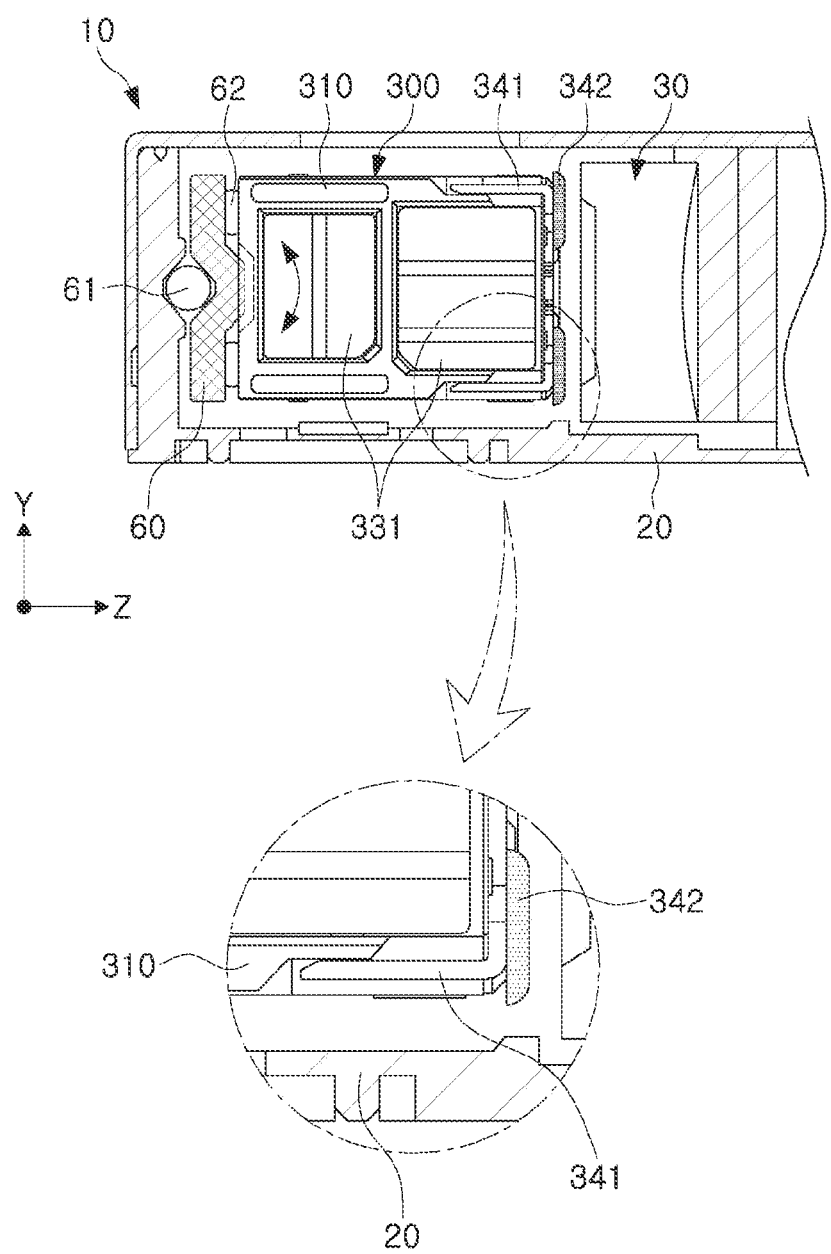
FIG. 15 is an example cross-sectional view showing a disposition of the reflective module of FIG. 13.

FIG. 13 is an exploded perspective view of the housing 20 and a reflective module 300 in the camera module 10 according to this other example embodiment; FIG. 14 is an exploded perspective view of the reflective module 300 shown in FIG. 13; and FIG. 15 is an example cross-sectional view showing a disposition of the reflective module 300 of FIG. 13. The reflective module 300 described with reference to FIGS. 13 through 15 may include the features of the reflective module 200 described with reference to FIGS. 10 through 12 above, and a redundant description is omitted.

In the present example embodiment, the reflective module 300 may include the damping member 340 which may absorb an impact applied to a reflective member 320, a reflective holder and the reflective module 300.

The damping member 340 may include at least one third damper 342 and a damper holder 341 fixing a third damper 342 to the reflective holder 310. The damper holder 341 may be coupled to the reflective holder 310 while supporting the third damper 342, and serve to fix the third damper 342 to the reflective holder 310. The third damper 342 may first collide with another fixture of the housing 20 or camera module 10 while the reflective holder 310 is moved, thereby absorbing energy of the impact applied to the reflective module 300 caused by the collision. For example, as shown in FIG. 15, the third damper 342 may be disposed on the damper holder 341 toward the lens module 30, and may have at least a portion protruding toward the upper or lower portion of the housing 20 more than the damper holder 341. Accordingly, the third damper 342 may first collide with fixtures (e.g., upper surface or lower surface of the housing 20 or fixture between the reflective module 300 and the lens module 30) positioned in the three-side directions of the reflective holder 341 while the reflective module 300 is rotated, thereby absorbing the collision energy.

In the present example embodiment, the damper holder 341 may be fastened to the reflective holder 310. For example, as shown in FIG. 14, the damper holder 341 may be inserted and coupled to the reflective holder 310 in a direction from the lens module 30 to the reflective module 300 (e.g., Z-axis direction in FIG. 14).

To fasten the damper holder 341 to the reflective module, the reflective holder 310 and the damper holder 341 may selectively include fastening protrusions 310a and 310b or fastening grooves 341a and 341b. For example, as shown in FIG. 14, the reflective holder 310 may include one or more fastening protrusions 310a and 310b, and the damper holder 341 may include one or more fastening grooves 341a and 341b into which the fastening protrusions 310a and 310b are inserted. In this manner, the damper holder 341 and the reflective holder 310 may be accurately and stably coupled to each other.

In the present example embodiment, the reflective module 300 may further include a drive unit 330 rotating the reflective holder 310. For example, the drive unit 330 may include a coil 332 and a magnet 331, and the coil 332 or the magnet 331 may be disposed on either the housing 20 or the reflective holder 310. The reflective holder 310 may include a seating portion 311 in which the coil 332 or the magnet 331 is seated.

In the present example embodiment, the damper holder 341 may be inserted into the reflective holder 310 to become at least a portion of the seating portion 311 in which the magnet 331 or coil 332 of the drive unit 330 is seated. For example, as shown in FIG. 14, the seating portion 311 of the reflective holder 310 may have at least one open side surface (e.g., portion of the seating portion 311, facing the lens module 30), and the damper holder 341 may cover the one open side surface of the seating portion 311 as being coupled to the reflective holder 310. Accordingly, at least one side surface of the magnet 331 seated in the seating portion 311 may directly face the damper holder 341. Due to this structure, it is possible to omit a portion corresponding to the one open side surface of the seating portion 311 of the reflective holder 310, and the reflective holder 310 may thus have less weight. In addition, referring to FIG. 15, the magnet 331 of the drive unit 330 may be disposed closer to the damper holder 341 disposed outside the reflective module 300. Accordingly, the magnet 331 may be disposed as far as possible from the guide member 60 and the ball member 61 forming the rotation axis of the reflective holder 310 to generate a large rotational torque. It is possible to precisely and rapidly control a rotation amount of the reflective module 300 according to the present example embodiment using the lightweight reflective holder 310 and the large rotational torque.

As set forth above, according to the example embodiments, it is possible to minimize the impact occurring when the reflective module collides with the fixture adjacent thereto.

According to the example embodiments, it is possible to increase the structural reliability of the reflective module by mitigating the impact received by the reflective module.

According to the example embodiments, it is possible to reduce the impact sound occurring when the reflective module collides with the fixture adjacent thereto, thereby preventing the occurrence of the noise (or joint noise).

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflective module assembly comprising:
a housing having an internal space; and
a reflective module accommodated in the internal space of the housing,
wherein the reflective module comprises a reflective holder supporting a reflective member configured to change a path of incident light, at least one damper coupled to the reflective holder, and a damper holder supporting the at least one damper,
wherein the at least one damper is coupled to the reflective holder through the damper holder, and
wherein a damping gap is formed between the at least one damper and the reflective holder, and the damping gap is an air gap.

2. The reflective module assembly of claim 1, wherein the at least one damper protrudes in a direction perpendicular to an incident surface of the reflective member.

3. The reflective module assembly of claim 1, wherein the damper holder comprises a first extension portion extended across a lower surface of the reflective holder, and a fastening portion bent and extended from each of two ends of the first extension portion and fixing the damper holder to the reflective holder, and
wherein the at least one damper comprises at least one first damper inserted and supported by the first extension portion.

4. The reflective module assembly of claim 3, wherein the first extension portion is in contact with the lower surface of the reflective holder,
wherein a first damper groove accommodating at least a portion of the at least one first damper is disposed in the lower surface of the reflective holder, and
wherein a first damping gap is formed between the first damper groove and the at least one first damper.

5. The reflective module assembly of claim 3, wherein the at least one first damper comprises a plurality of first dampers disposed on the first extension portion in a length direction, and
wherein a distance between the plurality of first dampers is equal to or less than a width of the reflective member.

6. The reflective module assembly of claim 3, wherein the at least one first damper of the reflective module is configured to first come into contact with a lower surface of the housing as the reflective holder is moved toward the lower surface of the housing.

7. The reflective module assembly of claim 6, wherein the housing further comprises a protrusion protruding from a portion of the lower surface of the housing, facing the at least one first damper, toward the reflective holder.

8. The reflective module assembly of claim 3, wherein the reflective holder further comprises a fastening protrusion protruding toward the damper holder, and
wherein a fastening groove into which the fastening protrusion is inserted is disposed in the fastening portion of the damper holder.

9. The reflective module assembly of claim 3, wherein the damper holder further comprises second extension portions respectively extended from ends of the fastening portions along an upper surface of the reflective holder in opposite directions, and
wherein the at least one damper comprises at least one second damper inserted and supported by the second extension portions.

10. The reflective module assembly of claim 9, wherein the second extension portions are spaced apart from each other by a distance corresponding to a width of the reflective member or more.

11. The reflective module assembly of claim 9, wherein a second damper groove accommodating at least a portion of the at least one second damper is disposed in the upper surface of the reflective holder, and
wherein a second damping gap is formed between the second damper groove and the at least one second damper.

12. The reflective module assembly of claim 9, further comprising an upper cover covering the housing,
wherein the at least one second damper of the reflective module is configured to first come into contact with the upper cover as the reflective holder is moved toward the upper cover.

13. The reflective module assembly of claim 1, wherein the damper holder comprises a coupling portion extended parallel to an exit surface of the reflective member and coupled to the reflective holder, and a bent portion bent at each of two ends of the coupling portion, and
wherein the at least one damper comprises at least one third damper inserted and supported by the bent portion.

14. The reflective module assembly of claim 13, wherein the at least one third damper is disposed to face a partial surface of the reflective holder, and wherein a third damping gap is formed between the at least one third damper and the partial surface of the reflective holder.

15. The reflective module assembly of claim 13, wherein the damper holder comprises a plurality of damper holders, and wherein the plurality of damper holders are coupled to the reflective holder interposing the reflective member therebetween.

16. A camera module comprising:
the reflective module assembly of claim 1;
a lens module assembly through which light emitted from the reflective member passes; and
an image sensor configured to convert light passing through the lens module assembly into an electrical signal.

17. The camera module of claim 16, wherein the lens module assembly comprises at least one lens barrel disposed in an optical axis direction.

18. The camera module of claim 17, wherein the at least one damper included in the reflective module assembly protrudes from the reflective holder in a direction intersecting the optical axis direction.

19. A reflective module for a camera module, comprising:
a housing;
a reflective holder disposed in the housing and movable in a first direction based on the housing;
a reflective member disposed on the reflective holder configured to change a path of light;
a damper holder coupled to the reflective holder in the first direction; and
a damper disposed on the damper holder protruding in the first direction.

20. The reflective module of claim 19, wherein the damper protrudes through the damper holder and the damper is spaced apart from the reflective holder by a damping gap.

21. The reflective module of claim 20, wherein the damper holder is configured to elastically flex upon a force applied to the damper in the first direction prior to the damper contacting the reflective holder.

* * * * *